(12) United States Patent
Arakawa et al.

(10) Patent No.: US 6,705,180 B2
(45) Date of Patent: Mar. 16, 2004

(54) AUTOMATIC TRANSMISSION OPERATING LEVER WITH SWITCH

(75) Inventors: Tetsuya Arakawa, Shizuoka-ken (JP); Ryoichi Fujiwara, Shizuoka-ken (JP)

(73) Assignee: Fujikiko Kabushiki Kaisha, Shizuoka-ken (JP)

( * ) Notice: Subject to any disclaimer, the term of this patent is extended or adjusted under 35 U.S.C. 154(b) by 0 days.

(21) Appl. No.: 10/114,442

(22) Filed: Apr. 2, 2002

(65) Prior Publication Data

US 2002/0139219 A1 Oct. 3, 2002

(30) Foreign Application Priority Data

Apr. 3, 2001 (JP) ...................... P2001-104484

(51) Int. Cl.[7] .............. G05G 1/04; H01H 9/06; B60K 20/00
(52) U.S. Cl. ............... 74/523; 74/473.1; 74/557; 74/543; 200/61.85; 200/61.88
(58) Field of Search ............... 74/523, 473.29, 74/473.1, 473 R, 475, 557, 543; 403/225, 228, 324.4; 200/61.85, 61.88

(56) References Cited

U.S. PATENT DOCUMENTS

| | | | | |
|---|---|---|---|---|
| 5,456,133 A | * | 10/1995 | Sogo et al. ............... 74/526 |
| 5,706,701 A | * | 1/1998 | Murakami ............... 74/335 |
| 5,833,578 A | * | 11/1998 | Potis ............... 477/165 |
| 5,880,422 A | * | 3/1999 | Sato et al. ............... 200/61.88 |
| 6,023,032 A | * | 2/2000 | Nakamura et al. ....... 200/61.88 |
| 6,038,937 A | * | 3/2000 | Van Order et al. ....... 74/473 R |
| 6,189,398 B1 | * | 2/2001 | Kataumi et al. ............... 74/423 |
| 6,513,406 B1 | * | 2/2003 | Murray et al. ............... 74/523 |

FOREIGN PATENT DOCUMENTS

| JP | 1-119424 | * | 5/1989 | ......... 74/523 |
|---|---|---|---|---|
| JP | 8-80758 | * | 3/1996 | ......... 74/523 |

* cited by examiner

Primary Examiner—Vinh T. Luong
(74) Attorney, Agent, or Firm—Kilpatrick Stockton LLP (57) ABSTRACT

An automatic transmission operating lever which includes a knob with a switch, a lever member and a conducting wire wired in the knob to send a signal from the switch. The lever member includes a rod to be inserted into the knob and a lever base having an end face to which the rod is connected. An insertion hole is provided on an end face, and the conducting wire is inserted thereto. A guide path communicates with the insertion hole and guides the conducting wire in a direction crossing an axial direction of the rod.

6 Claims, 6 Drawing Sheets

AUTOMATIC TRANSMISSION OPERATING LEVER WITH SWITCH

BACKGROUND OF THE INVENTION

1. Field of the Invention

The present invention relates to an automatic transmission operating lever of an automobile or the like, particularly to an automatic transmission operating lever equipped with a knob having a switch.

2. Description of the Related Art

In recent years, a four-speed automatic transmission has been becoming widespread in place of the conventional three-speed automatic transmission as an automatic transmission for an automobile or the like. An overdrive gear (fourth-speed gear) is provided in the four-speed automatic transmission, to improve fuel consumption of an automobile cruising at high speed or with a light load. A shift to the overdrive gear is performed by pushing an overdrive switch (O/D switch) provided on an operating knob of the automatic transmission operating lever.

In a conventional automatic transmission operating lever, the O/D switch is connected to a lead wire (conducting wire), which extends from the lower end of the operating knob and is soldered to a wire harness at the exposed end thereof, and the wire harness is connected to the control device of the automatic transmission.

Since soldering the wire harness to the lead wire has been necessary, the number of assembly steps has increased, resulting in high costs.

SUMMARY OF THE INVENTION

The object of the present invention is to provide an automatic transmission operating lever with a reduced number of assembly steps, thus contributing to lower costs.

A first aspect of the present invention is an automatic transmission operating lever comprising: a knob with a switch; a lever member including a rod inserted into the knob and a lever base coupled to the rod; and a conducting wire for sending a signal from the switch, the conducting wire being wired in the knob, wherein the lever base is configured with an end face to which the rod is connected, an insertion hole is provided on the end face and into which the conducting wire is inserted, and a guide path communicates with the insertion hole, the guide path leading the conducting wire in a direction crossing an axial direction of the rod.

According to the first aspect constituted as described above, since the guide path guides the conducting wire in a direction crossing the axial direction of the rod, the conducting wire can be guided out to a suitable position upon completion of engagement of the knob with the lever member, thus eliminating the task of extracting the conducting wire and facilitating a connection of the conducting wire to a wire harness connected to the control unit of the automatic transmission. The switch may be an overdrive switch with the conducting wire sending an ON/OFF signal thereof.

A second aspect of the present invention is the automatic transmission operating lever according to the first aspect, in which the knob is configured with a sleeve having a hole into which the rod is inserted, and the conducting wire is wired in the sleeve and extends from an end of the sleeve parallel to an axial direction of the hole of the sleeve.

According to the second aspect constituted as described above, since the conducting wire is wired in the sleeve and extends from the end of the sleeve parallel to the axial direction of the hole of the sleeve, the conducting wire of an appropriate stiffness can be readily inserted into the insertion hole when the rod is inserted into the knob with the sleeve sliding along the rod.

A third aspect of the present invention is the automatic transmission operating lever according to the first aspect, in which the guide path bends the conducting wire with a constant curvature and guides the conducting wire out of a side face of the lever base.

According to the third aspect constituted as described above, since the guide path guides the conducting wire out of a side face of the lever base, a connection of the conducting wire to a wire harness connected to the control unit of the automatic transmission is further facilitated.

A fourth aspect of the present invention is the automatic transmission operating lever according to the first aspect, further comprising: a connector provided in the lever base; and a wire coupling member connected to the connector and provided beside the guide path, wherein the conducting wire extends from the guide path and is located close to the wire coupling member by inserting the rod into the knob, so that the conducting wire can be pressed against the wire coupling member to couple the conducting wire therewith.

According to the fourth aspect constituted as described above, since the conducting wire extends from the guide path and is located close to the wire coupling member simply by inserting the rod into the knob, so that the conducting wire can be pressed against the wire coupling member to couple the conducting wire therewith, soldering work for the connection is eliminated and the number of assembly steps is decreased.

A fifth aspect of the present invention is the automatic transmission operating lever according to the first aspect, further comprising: a connector coupling hole provided on the side face of the lever base; and a connector coupled into the connector coupling hole, the connector having a guide protrusion at a tip of the connector, the guide protrusion facing the guide path with a predetermined space therebetween, wherein, when the rod is inserted into the knob, the guide path guides the conducting wire in a direction perpendicular to the axial direction of the rod, a tip of the conducting wire extends into the connector coupling hole, and the conducting wire is connected to the connector coupled into the connector coupling hole.

According to the fifth aspect constituted as described above, since the conducting wire extending into the connector coupling hole is automatically coupled to the connector upon completion of the engagement of the knob with the lever member in a state where the connector has been coupled into the connector coupling hole, the coupling work of the conducting wire and the connector is simplified and the number of assembly steps is decreased.

For the first to the fifth aspects of the present invention, a tubular section parallel to the rod or a tapered section tapering toward the guide path can be provided in the insertion hole. The presence of the tubular section parallel to the rod in the insertion hole smoothens the insertion of the conducting wire thereto. The tapered section tapering toward the guide path further facilitates the insertion of the conducting wire.

BRIEF DESCRIPTION OF THE DRAWINGS

The invention will now be described with reference to the accompanying drawings, wherein.

DETAILED DESCRIPTION OF THE PREFERRED EMBODIMENT

An embodiment of the present invention will be explained below with reference to the drawings, wherein like members are designated by like reference characters.

Figure 1:
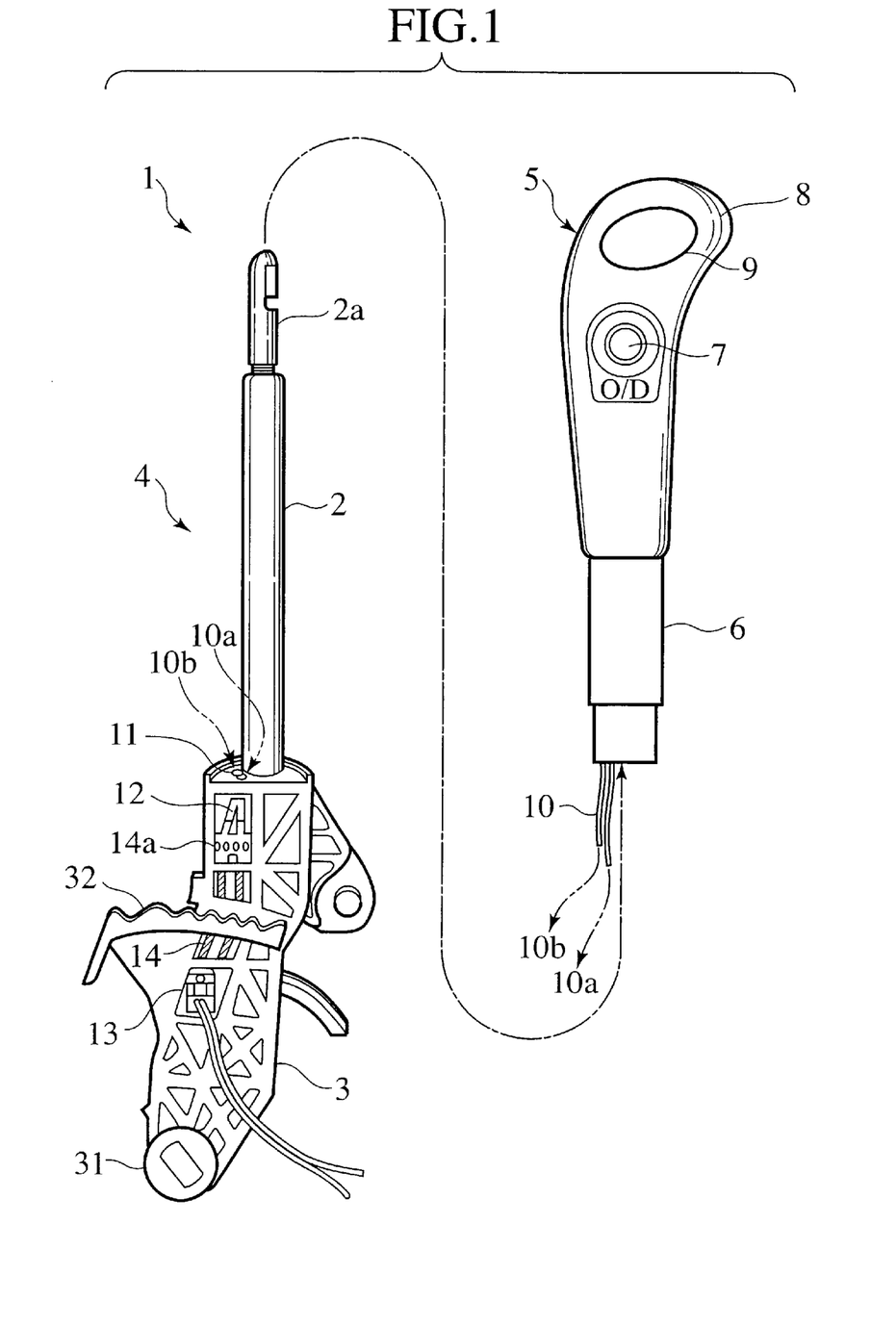
FIG. 1 is a perspective view showing an entire constitution of an automatic transmission operating lever of a first embodiment of the present invention, including a knob, a lever member, and conducting wires.

As shown in FIG. 1, an automatic transmission operating lever 1 of this embodiment includes a lever member 4 and an operating knob 5 to be engaged with the lever member 4.

The lever member 4 includes a lever base 3 made by molding and a rod 2 connected to the lever base 3. At a tip of the rod 2, a rod 2a to be linked to a knob button 9 is provided. The lever base 3 swings around a pivot 31 provided at a bottom thereof. In the middle of the lever base 3, a detent 32 for fixing a shift position of the operating lever 1 is provided. A connector 13 connected to a control unit (not shown) of the automatic transmission is attached to the lever base 3 between the pivot 31 and the detent 32.

The operating knob 5 includes a sleeve 6 to be engaged with the rod 2 connected to the lever base 3 and a grip 8 provided with a knob button 9. And at a lower portion of the grip 8, an O/D (overdrive) switch 7 is provided. Two conducting wires 10 connected to the O/D switch 7 are wired through the inside of the sleeve 6 and extend from a lower end of the sleeve 6 downward of the operating knob 5. In this embodiment, copper wires with an appropriate diameter to be stiff though flexible enough to be bent readily when external force is applied thereto, are used as the conducting wires 10.

Then, two insertion holes 11 respectively receiving the two conducting wires 10 extending from the lower end of the operating knob 5 are provided in the vicinity of the rod 2 connected on an upper end face of the lever base 3. As described above, the two conducting wires 10 are composed of single core copper wires of an appropriate diameter. Therefore, at the beginning of engagement of the operating knob 5 with the rod 2, the two conducting wires 10 extending downward from the operating knob 5 keep a shape thereof. Accordingly, as the operating knob 5 is being engaged with the rod 2, the two conducting wires 10 are readily inserted into the two insertion holes 11 as shown by reference numerals 10a and 10b, respectively.

In the insertion holes 11 of the lever base 3, guide paths 12 are provided, which bend and lead the two conducting wires 10 respectively inserted into the two insertion holes 11 to connection hooks 14a. The connection hooks 14a are provided at an end of a wire coupling member 14 connected to the connector 13. Description will be made later of the shape of the guide paths 12 and the connection hooks 14a.

Figure 2A:
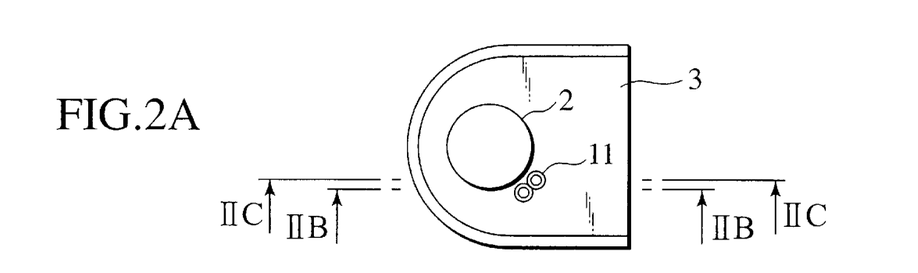
FIG. 2A is a plan view showing insertion holes for the conducting wires, provided on an end face of the lever member of FIG. 1.

FIG. 2A shows an arrangement of the insertion holes 11 for conducting wires 10, which are provided at the upper end of the lever base 3. The insertion holes 11 are provided side by side in the vicinity of where the rod 2 is connected. Inlets of the insertion holes 11 for the conducting wires 10 have a large diameter so that the conducting wires 10 can be readily inserted thereto.

Figure 2B:
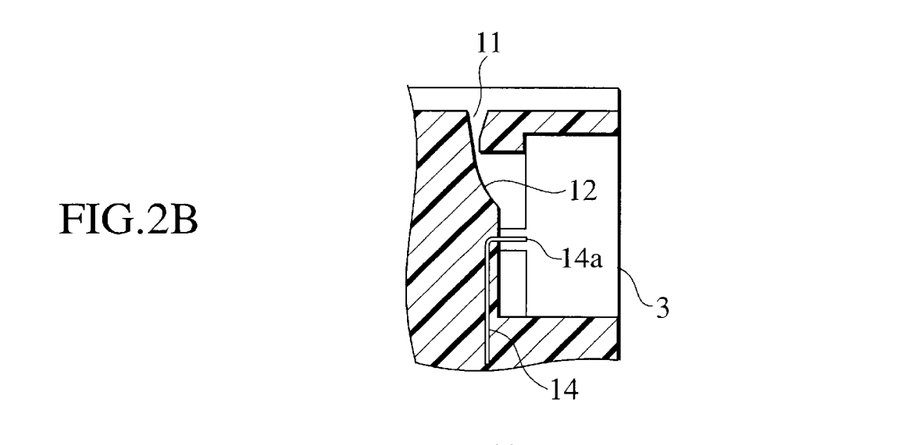
FIGS. 2B and 2C are cross-sectional views taken along a line IIB—IIB and a line IIC—IIC of FIG. 2A respectively.

As shown in FIG. 2B, the inlet of each insertion hole 11 has a large diameter so that the conducting wire 10 can be readily inserted thereto, and the insertion hole 11 is tapered and has a smaller diameter toward the inside thereof. The guide path 12 is provided in the lever base 3, communicating with the insertion hole 11, which guides the conducting wire 10, once inserted to the insertion hole 11 along a curve of a constant curvature to the position where the conducting wire 10 is readily accessible. Moreover, the connection hook 14a of the wire coupling member 14 is provided adjacent to the guide path 12 in the lever base 3. As shown in FIG. 2D, the connection hook 14a is provided at the end of the wire coupling member 14.

Figure 2C:
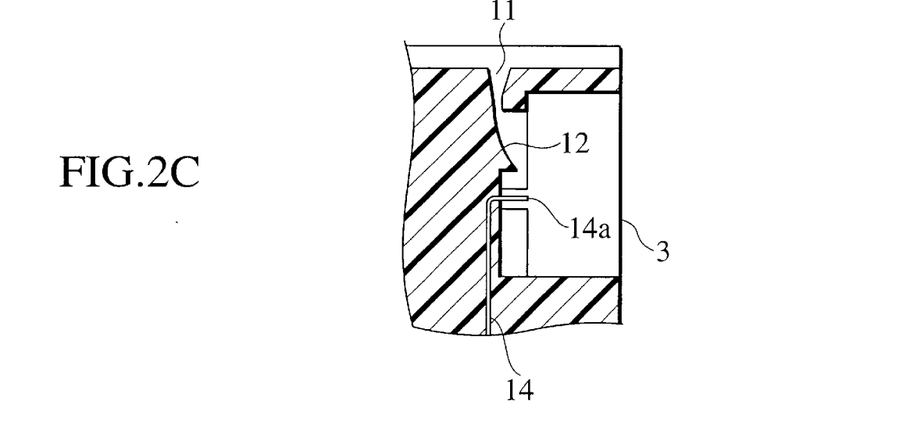
Figure 2D:
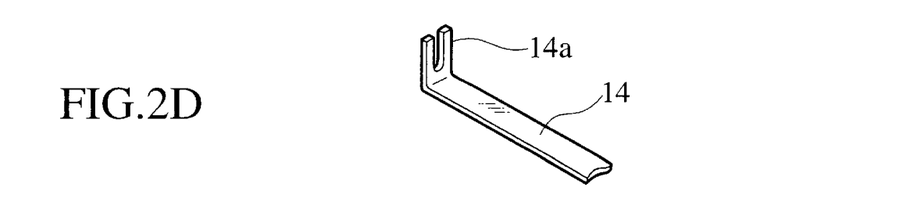
FIG. 2D is a perspective view showing an end shape of a wire coupling member to be coupled to the conducting wire extending from the knob of FIG. 1.

As shown in FIG. 2C, the insertion hole 11 is tapered so that the conducting wire 10 can be readily inserted thereto. The guide path 12 is provided in the lever base 3, communicating with the insertion hole 11, which guides the conducting wire 10 inserted to the insertion hole 11 along a curve of a constant curvature to the position where the conducting wire 10 is readily accessible. Moreover, the connection hook 14a of the wire coupling member 14 is provided adjacent to the guide path 12 in the lever base 3.

Here, with reference to FIGS. 3A, 3B and 3C, description will be made of an operation of the first embodiment of the automatic transmission operating lever 1 of the present invention, constituted as described above.

Figure 3A:
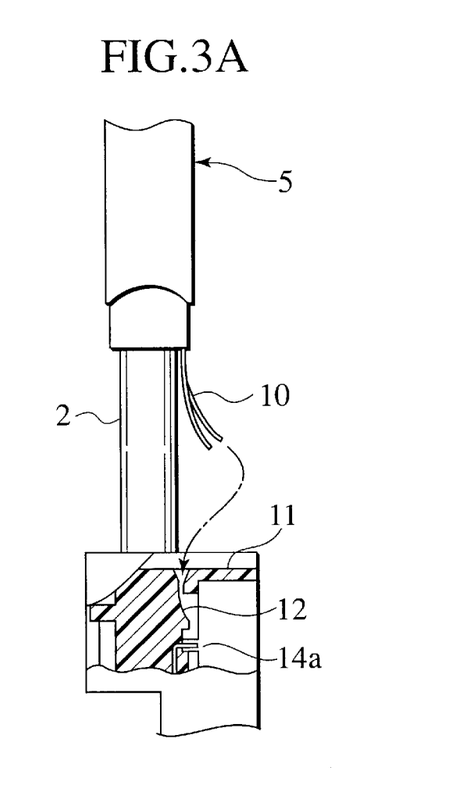
FIG. 3A is an explanatory view, partially cross-sectioned, showing a state where a rod of the lever member is being inserted into the knob of FIG. 1.
Figure 3B:
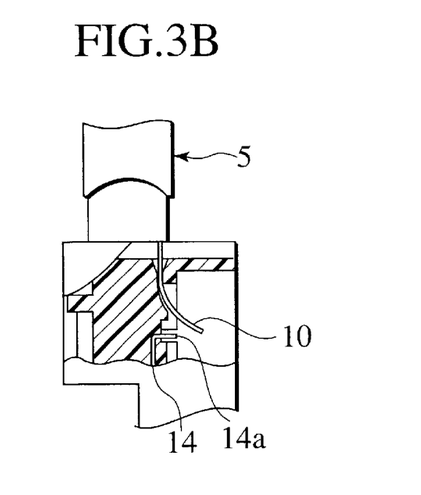
FIG. 3B is an explanatory view, partially cross-sectioned, showing a state where the rod of the lever member has been inserted into the knob of FIG. 1, the conducting wire is located close to the wire coupling member.
Figure 3C:
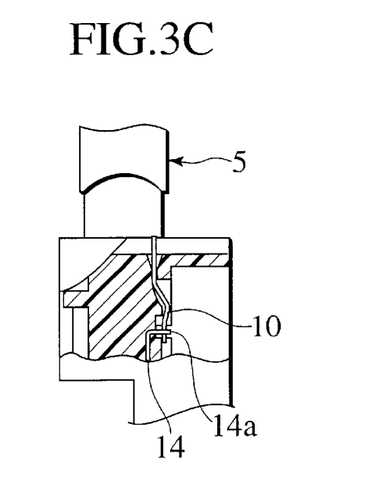
FIG. 3C is an explanatory view, partially cross-sectioned, showing a state where the conducting wire has been coupled to the wire coupling member of the lever member of FIG. 1.

FIG. 3A shows a state where the operating knob 5 of the automatic transmission operating lever 1 is being engaged with the lever member 4 sliding along the rod 2. When the conducting wires 10 reach the upper end face of the lever base 3, the tips of the conducting wires 10 are inserted into the insertion holes 11. If the operating knob 5 continues to be inserted in this state, when the operating knob 5 completely engages with the rod 2, each conducting wire 10 will be bent by the guide path 12 as shown in FIG. 3B, and the tip of the conducting wire 10 will be positioned above the connection hook 14a of the wire coupling member 14 disposed in the lever base 3. Therefore, if the conducting wire 10 is pressed in the leftward direction from the right in the drawing by means of a jig and the like in this state, the conducting wire 10 will be connected to the connection hook 14a of the wire coupling member 14 as shown in FIG. 3C. As described above, the conducting wire 10 can be simply connected to the wire coupling member 14 in the first embodiment.

Figure 4:
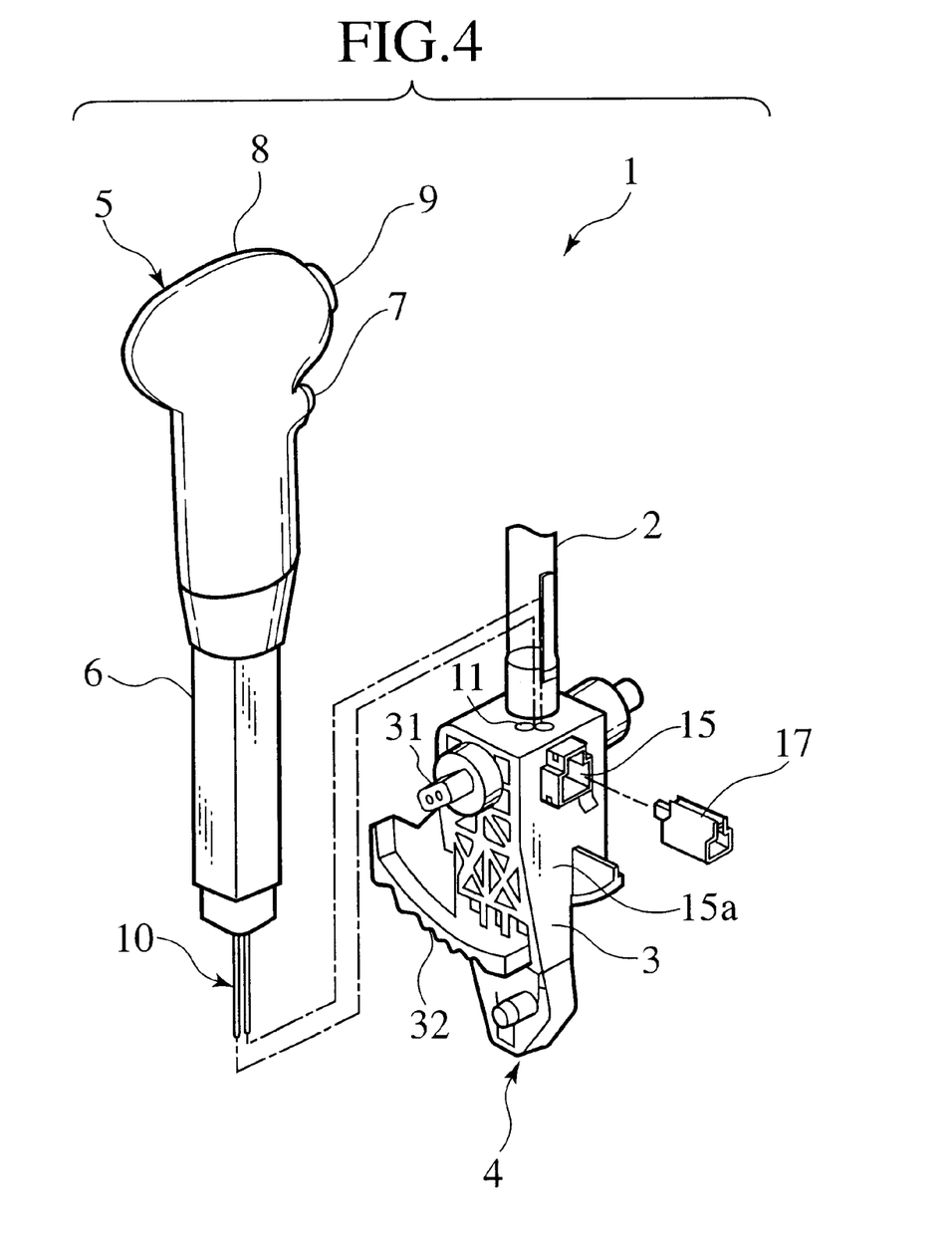
FIG. 4 is a perspective view showing an entire constitution of an automatic transmission operating lever of a second embodiment of the present invention, including a knob, a lever member, a connecter, and conducting wires.

Here, with reference to FIG. 4, description will be made of an operation of the second embodiment of the automatic transmission operating lever 1 of the present invention, with the same constituent components as those in the first embodiment denoted by the same reference numerals. The operating lever 1 of the automatic transmission of the second embodiment is also constituted of a lever member 4 and an operating knob 5 engaged with the lever member 4.

The lever member 4 includes a lever base 3 made by molding and a rod 2 connected to the lever base 3. The lever base 3 swings around a pivot 31 provided to an upper portion thereof. In the middle of the lever base 3, a detent 32 for fixing a shift position of the operating lever 1 is provided. A connector coupling hole 15 is provided on a side face 15a parallel to a plane including an axis of the pivot 31 and an axis of the rod 2, which is for coupling a connector 17 to be connected to the other connector of a wire harness connected to the control unit (not shown) of the automatic transmission.

Meanwhile, the operating knob 5 includes a sleeve 6 to be engaged with the rod 2 connected to the lever base 3 and a grip 8 provided with a knob button 9, and at a lower portion of the grip 8, an O/D switch 7 is provided. Two conducting wires 10 connected to the O/D switch 7 are wired through the inside of the sleeve 6 and extend from a lower end of the sleeve 6 downward of the operating knob 5. Also in this embodiment, copper wires with an appropriate diameter to be stiff though flexible enough to be bent readily when external force is applied thereto, are used as the conducting wires 10.

Then, two insertion holes 11 respectively receiving the two conducting wires 10 extending from the lower end of the operating knob 5 are provided in the vicinity of the rod 2 connected on an upper end face of the lever base 3. As described above, since the two conducting wires 10 are stiff with an appropriate diameter, the two conducting wires 10 extending downward from the operating knob 5 keep a shape thereof at the beginning of engagement of the operating knob 5 with the rod 2. Accordingly, when the operating knob 5 is being engaged with the rod 2, the two conducting wires 10 can be readily inserted into the two insertion holes 11, respectively.

Figure 5A:
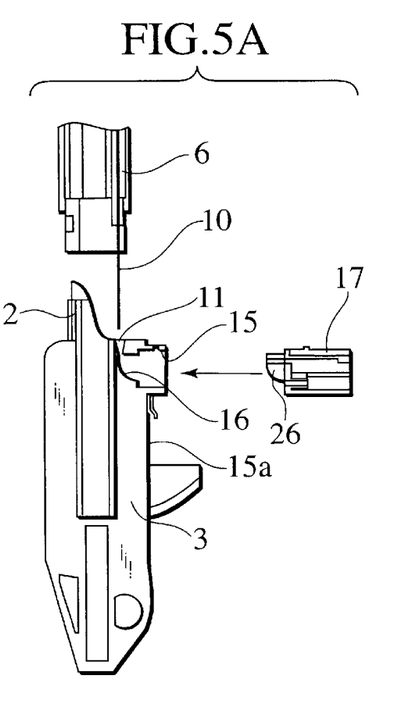
FIG. 5A is an explanatory cross-sectional view showing a state before the knob is engaged with the lever member and the connector is coupled to the lever member of FIG. 4.
Figure 5B:
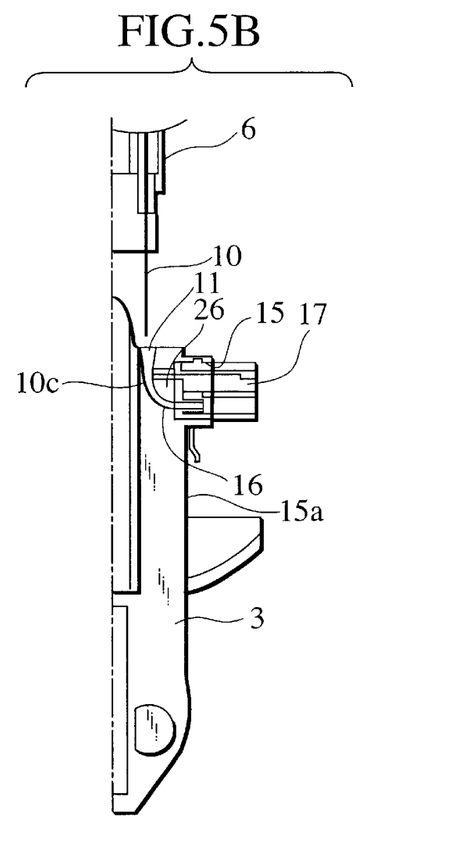
FIG. 5B is an explanatory cross-sectional view showing a state where the knob is being engaged with the lever member, with the connector coupled to the lever member of FIG. 4.
Figure 6A:
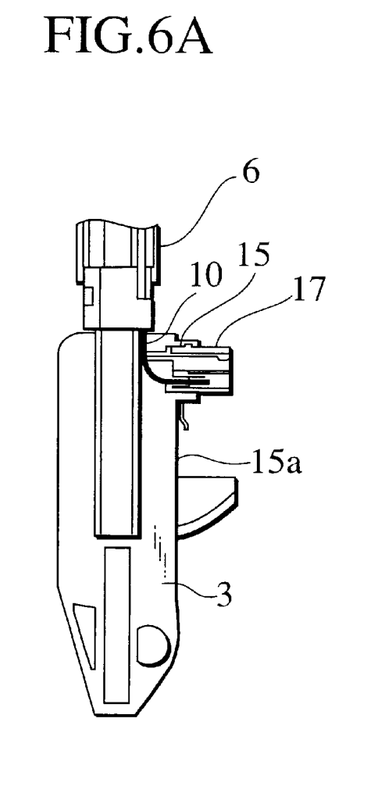
FIG. 6A is a cross-sectional view taken along a line VIA—VIA of FIG. 6B, showing a state where the knob has been engaged with the lever member, the connector has been coupled to the lever member, and the conducting wire has been coupled to the connector of FIG. 4.
Figure 6B:
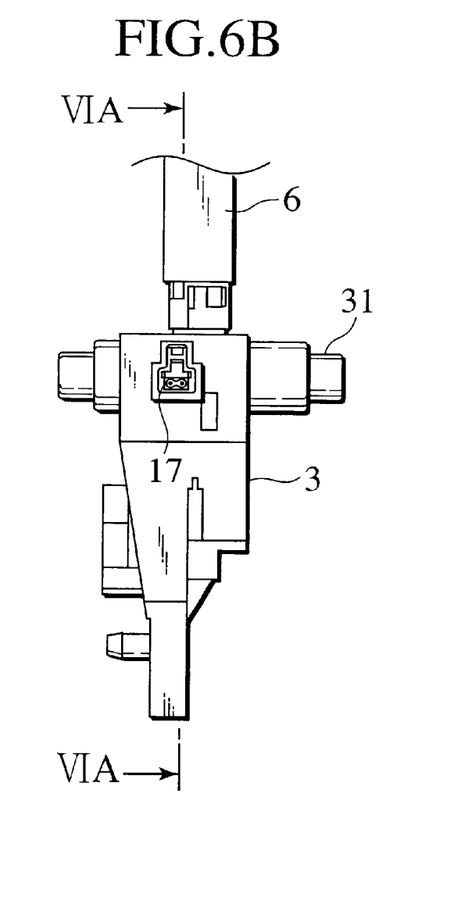
FIG. 6B is a front view showing a state where the knob has been engaged with the lever member and the connector has been coupled to the lever member of FIG. 4.

FIG. 5A shows a portion communicating with the two insertion holes 11 provided in the lever base 3 in the second embodiment. Also in the second embodiment, an inlet of each insertion hole 11 is tapered so that the conducting wire 10 can be readily inserted thereto. The guide path 16 is provided in the lever base 3, communicating with the insertion hole 11, which bends the conducting wire 10 inserted into the insertion hole 11 in a direction perpendicular to an axial direction of the rod 2 and guides the tip of the conducting wire 10 to the inside of the connector coupling hole 15 upon completion of the engagement of the sleeve 6 with the rod 2.

The guide path 16 is located at a bottom of the connector coupling hole 15 provided on the side face 15a of the lever base 3. A guide protrusion 26 is provided at a tip of the connector 17 coupled to the connector coupling hole 15, which serves as a guiding wall facing the guide path 16 with a predetermined space therebetween. In a state where the connector 17 is coupled to the connector coupling hole 15, a space 10c is formed between the guide path 16 and the guide protrusion 26. When the rod 2 is inserted to the sleeve 6, the conducting wire 10 extending from the lower end of the sleeve 6 is guided by the guide path 15 and by the guide protrusion 26 and bent along the space 10c, and the conducting wire 10 is directed perpendicular to the side face 15a of the lever base 3.

Here, with reference to FIGS. 5A, 5B, 6A and 6B, description will be made for an operation of the second embodiment of the automatic transmission operating lever 1 of the present invention, constituted as described above.

FIG. 5A shows a state where the operating knob 5 of the automatic transmission operating lever 1 is being engaged with the lever member 4. The connector 17 should be coupled to the connector coupling hole 15 before the operating knob 5 begins engagement with the rod 2 of the lever member 4 by sliding along the rod 2. Then, when the conducting wires 10 reach the upper end face of the lever base 3, the tips of the conducting wires 10 are inserted into the insertion holes 11, respectively. If the operating knob 5 continues to be inserted in this state, each conducting wire 10 will be bent in the direction perpendicular to the axial direction of the rod 2 along the space 10c between the guide path 16 and the guide protrusion 26 shown in FIG. 5B. Then, in a state where the operating knob 5 is completely engaged with the rod 2, the tip of the conducting wire 10 is guided into the connector 17 coupled to the connector coupling hole 15 and connected to a terminal of the connector 17. The conducting wire 10 extending into the connector coupling hole 15 is smoothly guided to the connector 17 by adopting a shape appropriate for the guide path 16 and the guide protrusion 26.

As described above, in the second embodiment, as shown in FIGS. 6A and 6B, the tip of the conducting wire 10 can be connected to the connector 17 simply by engaging the sleeve 6 of the operating knob 5 with the rod 2 in a state where the connector 17 is coupled to the connector coupling hole 15.

Although only two embodiments of the invention have been disclosed and described, it is apparent that the other embodiments and modification of the invention are possible.

What is claimed is:

1. An automatic transmission operating lever comprising:
   a knob having a switch and a conducting wire connected to the switch, the conducting wire being wired in the knob and having a free end portion extended out of the knob; and
   a lever member having a base portion, a rod extending from an end face of the base portion for insertion into the knob, an insertion hole provided at the end face into which the conducting wire is inserted, and a guide path leading from the insertion hole,
   wherein the insertion hole and the guide path are configured to receive the free end portion of the conducting wire and to guide the inserted free end portion in a direction crossing an axial direction of the rod, as the rod is inserted into the knob, and
   wherein the insertion hole is configured with a tapered section tapering toward the guide path.

2. The automatic transmission operating lever according to claim 1, wherein the knob is configured with a sleeve into which the rod is inserted, and the conducting wire is wired in the sleeve and the free end portion of the conducting wire extends from an end of the sleeve parallel to an axial direction of the sleeve.

3. The automatic transmission operating lever according to claim 1, wherein the switch comprises an overdrive switch, and the conducting wire sends an ON/OFF signal of the overdrive switch.

4. The automatic transmission operating lever according to claim 1, wherein the guide path guides the conducting wire, bending the conducting wire with a constant curvature, out of a side face of the base portion of the lever member.

5. The automatic transmission operating lever according to claim 1, wherein the insertion hole is configured with a tubular section parallel to the rod.

6. An automatic transmission operating lever comprising:

a knob with a switch;

a conducting wire for sending a signal from the switch, the conducting wire being wired in the knob, a lever member including a rod for insertion into the knob and a lever base coupled to the rod, the lever base configured with an end face to which the rod is connected, an insertion hole provided at the end face into which the conducting wire is inserted, a guide path communicating with the insertion hole to lead the conducting wire in a direction perpendicular to an axial direction of the rod, and a connector coupling hole provided on the side face of the lever base; and a connector coupled into the connector coupling hole, the connector having a guide protrusion at a tip of the connector, the guide protrusion facing the guide path with a predetermined space therebetween, wherein, when the rod is inserted into the knob, the guide path guides the conducting wire in a direction perpendicular to the axial direction of the rod, a tip of the conducting wire extends into the connector coupling hole, and the conducting wire is connected to the connector coupled into the connector coupling hole.

* * * * *